UNITED STATES PATENT OFFICE.

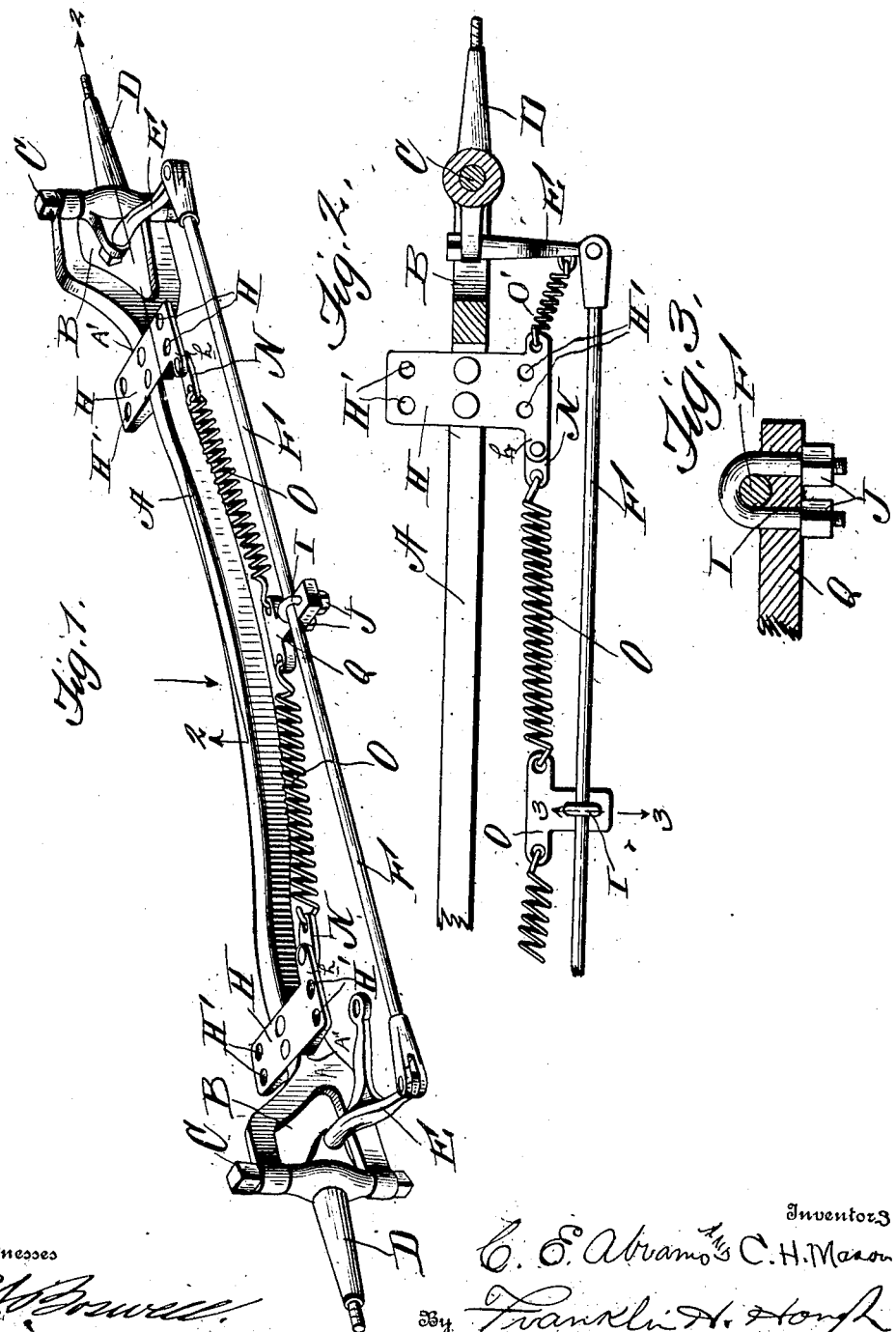

CHARLES E. ABRAMS AND CHARLES H. MASON, OF CHATHAM, NEW YORK.

ATTACHMENT FOR RUNNING-GEARS OF VEHICLES.

No. 925,740.  Specification of Letters Patent.  Patented June 22, 1909.

Application filed January 22, 1908. Serial No. 412,163.

*To all whom it may concern:*

Be it known that we, CHARLES E. ABRAMS and CHARLES H. MASON, citizens of the United States, residing at Chatham, in the county of Columbia and State of New York, have invented certain new and useful Improvements in Attachments for Running-Gears of Vehicles; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments to the running gear of vehicles of various kinds for aiding in guiding the vehicle, reducing the jar and trembling motion, taking up vibration and assisting the driver of the vehicle in the control of the same.

The invention comprises various details of construction and combinations and arrangements of parts which will be hereinafter fully described and then specifically defined in the appended claim.

Our invention is illustrated in the accompanying drawings, in which:—

Figure 1 is a perspective view of the invention. Fig. 2 is a sectional view on line 2—2 of Fig. 1, showing a slight modification in the addition of an auxiliary spring. Fig. 3 is a cross sectional view.

Reference now being had to the details of the drawings by letter, A designates an axle of a vehicle and has forked ends B, each forked end carrying a pivot pin C upon which a stub axle D is pivotally mounted. Each stub axle has a laterally projecting arm E, to the ends of which a rod F is pivotally connected whereby the two stub axles are caused to move in unison. The upper portion of the axle is preferably recessed as at A' at two locations and each recess is adapted to receive a plate H, which plate is provided with apertures H' by means of which the axle A may be attached to the vehicle. It will be noted that each of said plates or clips H is provided with laterally projecting portions having apertures H' therein and a portion of each plate has an integral finger h the two fingers extending toward each other, and each finger is apertured for the reception of a pin to which the link N is pivotally connected. O—O designate two coiled springs, each of which is connected at its outer end to one of said links and the inner end of each spring is connected to a clip Q through which a clevis I passes, the ends of said clevis being threaded and adapted to receive the nuts J, whereby the clip may be held in an adjusted position upon the rod connecting said stub axles.

In Fig. 2 of the drawings, it will be noted that an auxiliary spring O' is connected at one end to a plate H and its other end to a finger of the stub axle. This extra spring may be employed one at each end of the axle, if desired, and the intermediate springs O may be dispensed with when desired when the auxiliary springs are used.

From the foregoing, it will be understood that the essence of the present invention consists in the utilization of springs attached in any desired manner to the steering gear of a vehicle and axle and it will be understood that we do not limit ourselves to any particular detailed construction of apparatus whereby the springs may be applied.

The operation of our invention will be readily understood. When it is applied to an automobile or any other vehicle, the wheels, owing to the arrangement of the springs, will be kept normally in planes at right angles to the axle A and, in the event of the wheels coming in contact with any obstruction which would have a tendency to throw the wheels out of track, the springs would cause the wheels to quickly return to their normal positions after being thrown to one side or the other. The apparatus will also assist the driver in guiding the vehicle equipped with the apparatus and will take up any vibration or jar coming upon the wheels as would be the case were the springs omitted and, in the event of any breakage of the steering gear, the operator of the machine may have an opportunity to apply the brakes to stop the machine before the latter leaves the track.

What we claim is:—

In combination with the main and stub axles, a steering rod pivotally connected to said stub axle, the upper surface of said main axle having recesses near its ends, a plate seated in each of said recesses and having its end extending beyond the axle upon opposite sides thereof, and apertured, each plate provided with an integral finger which fingers extend toward each other, a link pivotally connected to each finger, a T-shaped clip having eyes in the laterally extending portions thereof, a clevis engaging said rod and passing through said clip, springs connecting the apertured ends of said clip and said links, as set forth.

In testimony whereof we hereunto affix our signatures in the presence of two witnesses.

CHARLES E. ABRAMS.
CHARLES H. MASON.

Witnesses:
JOHN C. DARDESS,
IZETTA M. REYNOLDS.